US008262866B2

(12) United States Patent
Lockhart et al.

(10) Patent No.: US 8,262,866 B2
(45) Date of Patent: Sep. 11, 2012

(54) APPARATUS FOR THE RECOVERY OF HYDROCARBONACEOUS AND ADDITIONAL PRODUCTS FROM OIL SHALE AND SANDS VIA MULTI-STAGE CONDENSATION

(75) Inventors: Michael D. Lockhart, Charlottesville, VA (US); Ron McQueen, Park City, UT (US)

(73) Assignee: General Synfuels International, Inc., Delta, CO (US)

( * ) Notice: Subject to any disclaimer, the term of this patent is extended or adjusted under 35 U.S.C. 154(b) by 516 days.

(21) Appl. No.: 12/421,306

(22) Filed: Apr. 9, 2009

(65) Prior Publication Data

US 2010/0258476 A1    Oct. 14, 2010

(51) Int. Cl.
*B01D 5/00* (2006.01)

(52) U.S. Cl. .............. 196/138; 196/139; 202/185.1; 202/185.2; 202/185.5; 202/185.6

(58) Field of Classification Search ............... 166/261; 202/185.1, 185.2, 185.5, 185.6; 196/138, 196/139, 102
See application file for complete search history.

(56) References Cited

U.S. PATENT DOCUMENTS

| | | | |
|---|---|---|---|
| 3,749,170 A | 7/1973 | Riehl | |
| 4,064,938 A | 12/1977 | Fast | |
| 4,419,215 A * | 12/1983 | Voetter et al. | 208/410 |
| 4,561,941 A | 12/1985 | Dinnage et al. | |
| 4,651,535 A * | 3/1987 | Alsenz | 62/225 |
| 4,706,752 A | 11/1987 | Holm | |
| 4,939,905 A | 7/1990 | Manz | |
| 5,027,642 A | 7/1991 | Wen et al. | |
| 5,401,364 A | 3/1995 | Rinker | |
| 7,041,051 B2 | 5/2006 | Bernstein | |
| 7,048,051 B2 * | 5/2006 | McQueen | 166/261 |
| 8,042,610 B2 * | 10/2011 | Harris et al. | 166/60 |
| 2002/0156332 A1 | 10/2002 | Jiang | |
| 2004/0149433 A1 | 8/2004 | McQueen | |
| 2005/0287056 A1 | 12/2005 | Baker et al. | |
| 2006/0006099 A1 | 1/2006 | Espinoza et al. | |
| 2007/0131427 A1 | 6/2007 | Li et al. | |
| 2009/0056944 A1 | 3/2009 | Nitschke | |

* cited by examiner

*Primary Examiner* — Nina Bhat
(74) *Attorney, Agent, or Firm* — Gifford, Krass, Sprinkle, Anderson & Citkowski, P.C.

(57) ABSTRACT

A system for recovering products from a gas stream comprises a cooled chamber having an inlet that feeds the gas stream to a plurality of sequential conduit loops within the chamber. A critical orifice follows each loop, and each loop includes an output port. Based upon the physical characteristics of each loop, the sizing of the critical orifice following the loop, and the temperature within the chamber, different products are condensed from the gas stream through the output ports. The system may be configured to condense hydrocarbonaceous products such as ethane, propane, butane or methane, as well as fundamental products such as carbon dioxide, nitrogen or hydrogen. Gaseous products may be stored in gas or liquid form or vented to atmosphere depending upon amount, purity, and so forth.

7 Claims, 3 Drawing Sheets

APPARATUS FOR THE RECOVERY OF HYDROCARBONACEOUS AND ADDITIONAL PRODUCTS FROM OIL SHALE AND SANDS VIA MULTI-STAGE CONDENSATION

FIELD OF THE INVENTION

The present invention relates generally to the recovery of hydrocarbonaceous products from oil shale and oil/tar sands and, in particular, to a process and system for recovering such products and byproducts with significantly reduced environmental impact.

BACKGROUND OF THE INVENTION

The term "oil shale" refers to a sedimentary rock interspersed with an organic mixture of complex chemical compounds collectively referred to as "kerogen." The oil shale consists of laminated sedimentary rock containing mainly clay with fine sand, calcite, dolomite, and iron compounds. Oil shales can vary in their mineral and chemical composition. When the oil shale is heated to about 250-400° F., destructive distillation of the kerogen occurs to produce products in the form of oil, gas, and residual carbon. The hydrocarbonaceous products resulting from the destructive distillation of the kerogen have uses which are similar to petroleum products. Indeed, oil shale is considered to be one of the primary sources for producing liquid fuels and natural gas to supplement and augment those fuels currently produced from petroleum sources.

Processes for recovering hydrocarbonaceous products from oil shale may generally be divided into in situ processes and above-ground processes. In situ processes involve treating oil shale which is still in the ground in order to remove the hydrocarbonaceous products, while above-ground processes require removing the oil shale from the ground through mining procedures and then subsequently retorting in above-ground equipment. Clearly, in situ processes are economically desirable since removal of the oil shale from the ground is often expensive. However, in situ processes are generally not as efficient as above-ground processes in terms of total product recovery.

Historically, prior art in situ processes have generally only been concerned with recovering products from oil shale which comes to the surface of the ground; thus, prior art processes have typically not been capable of recovering products from oil shale located at great depths below the ground surface. For example, typical prior art in situ processes generally only treat oil shale which is 300 feet or less below the ground surface. However, many oil shale deposits extend far beyond the 300 foot depth level; in fact, oil shale deposits of 3000 feet or more deep are not uncommon.

Moreover, many, if not most, prior art processes are directed towards recovering products from what is known as the "mahogany" layer of the oil shale. The mahogany layer is the richest zone of the oil shale bed, having a Fischer assay of about twenty-five gallons per ton (25 gal/ton) or greater. The Mahogany Zone in the Piceance Creek Basin consists of kerogen-rich strata and averages 100 to 200 ft thick. This layer has often been the only portion of the oil shale bed to which many prior art processes have been applied.

For economic reasons, it has been found generally uneconomical in the prior art to recover products from any other area of the oil shale bed than the mahogany zone.

Thus, there exists a relatively untapped resource of oil shale, especially deep-lying oil shale and oil shale outside of the mahogany zone, which have not been treated by prior art processes mainly due to the absence of an economically viable method for recovering products from such oil shale.

Another important disadvantage of many, if not most prior art in situ oil shale processes is that expensive rubilization procedures are often necessary before treating the oil shale. Rubilization of the in situ oil shale formation is typically accomplished by triggering underground explosions so as to break up the oil shale formation. In such prior art process, it has been necessary to rubilize the oil shale formation so as to provide a substantial reduction in the particle size of the oil shale. By reducing the particle size, the surface area of the oil shale treated is increased, in an attempt to recover a more substantial portion of products therefrom. However, rubilization procedures are expensive, time-consuming, and often cause the ground surface to recede so as to significantly destroy the structural integrity of the underground formation and the terrain supported thereby. This destruction of the structural integrity of the ground and surrounding terrain is a source of great environmental concern.

Rubilization of the oil shale in prior art in situ processes has a further disadvantage. Upon destructive distillation of the kerogen in the oil shale to produce various hydrocarbonaceous products, these products seek the path of lease resistance when escaping through the marlstone of the oil shale formation. By rubilizing the oil shale formation, many different paths of escape are created for the products; the result is that it is difficult to predict the path which the products will follow. This, of course, is important in terms of withdrawing the products from the rubilized oil shale formation so as to enable maximum recovery of the products. Since the products have numerous possible escape paths to follow within the rubilized oil shale formation, the task of recovering the products is greatly complicated.

Oil/tar sands, often referred to as 'extra heavy oil,' are types of bitumen deposits. The deposits are naturally occurring mixtures of sand or clay, water and an extremely dense and viscous form of petroleum called bitumen. They are found in large amounts in many countries throughout the world, but are found in extremely large quantities in Canada and Venezuela.

Due to the fact that extra-heavy oil and bitumen flow very slowly, if at all, toward producing wells under normal reservoir conditions, the sands are often extracted by strip mining or the oil made to flow into wells by in situ techniques which reduce the viscosity by injecting steam, solvents, and/or hot air into the sands. These processes can use more water and require larger amounts of energy than conventional oil extraction, although many conventional oil fields also require large amounts of water and energy to achieve good rates of production.

Like all mining and non-renewable resource development projects, oil shale and sands operations have an effect on the environment. Oil sands projects may affect the land when the bitumen is initially mined and with large deposits of toxic chemicals, the water during the separation process and through the drainage of rivers, and the air due to the release of carbon dioxide and other emissions, as well as deforestation. Clearly any improvements in the techniques use to extract hydrocarbonaceous products from shale and sands would be appreciated, particularly if efficiency is improved and/or environmental impact is reduced.

Certain improvements with respect to the recovery of products from shale are disclosed in U.S. Pat. No. 7,041,051. Unlike other prior art processes, the in situ body of oil shale to be treated is not rubilized. Rather, the process includes drilling a hole in the body of nonrubilized oil shale, and locating a processing gas inlet conduit within the hole such that the bottom end of the processing inlet gas conduit is near the bottom of the hole. An effluent gas conduit is anchored around the opening of the hole at the ground surface of the body of oil shale. A processing gas is introduced into an above-ground combustor. In the combustor, the processing gas, which contains enough oxygen to support combustion, is heated by burning a combustible material introduced into the combustor in the presence of the processing gas. The resultant heated processing gas is of a temperature sufficient to convert kerogen in the oil shale to gaseous hydrocarbonaceous products.

The heat from the heated processing gas, as well as radiant heat from the processing gas inlet conduit, create a nonburning thermal energy front in the oil shale surrounding the hole. The kerogen is thus pyrolyzed and converted into hydrocarbonaceous products. The products produced during pyrolysis of the kerogen are in gaseous form and are withdrawn with the processing gas as an effluent gas through the hole and into the effluent as conduit. The effluent gas is transferred through the effluent gas conduit into a condenser where the effluent gas is allowed to expand and cool so as to condense a portion of the hydrocarbonaceous products into a liquid fractions. In the condenser, a remaining gaseous fraction of hydrocarbonaceous products is separated from the liquid fraction of hydrocarbonaceous products. The gaseous fraction is preferably filtered and or scrubbed so as to separate the upgraded gas products from any waste gases including the inorganic gas carbon dioxide.

According to the '051 patent, expensive and time-consuming rubilization procedures are eliminated, and the structural integrity of the ground and surrounding terrain are preserved. While a portion of the upgraded hydrocarbon gas may be recycled to the combustor to provide combustible material for fueling combustion within the combustor, and while a portion of the waste inorganic gas may be recycled to the compressor for augmenting the supply of carbon dioxide in the processing gas, further improvements are possible, both in the generation of the heated, processing gas as well as the recovery of products and byproducts produced in the condenser.

SUMMARY OF THE INVENTION

This invention resides in a system for recovering products from a gas stream. In broad terms, the system comprises a cooled chamber having an inlet that feeds the gas stream to a plurality of sequential conduit loops within the chamber. A critical orifice follows each loop, and each loop includes an output port. Based upon the physical characteristics of each loop, the sizing of the critical orifice following the loop, and the temperature within the chamber, different products are condensed from the gas stream through the output ports.

The system is not limited in terms of application so long as the physical characteristics of the loops and critical orifices may be configured to extract desired products from a gas stream at a given temperature. For example, the system may be configured to condense hydrocarbonaceous products such as ethane, propane, butane or methane, as well as fundamental products such as carbon dioxide, nitrogen or hydrogen. Gaseous products may be stored in gas or liquid form or vented to atmosphere depending upon amount, purity, and so forth. One or more of the products may also be used for cooling purposes; for example, condensed liquefied $CO_2$ may be used to cool the loops and orifices within the chamber.

The gas stream fed to the system may be derived from various sources. As one example, the gas stream may be an effluent gas stream containing hydrocarbonaceous and additional products from a hole drilled in nonrubilized oil shale and oil/tar sands heated with a pressurized processing gas introduced into the hole. In such an application, the inlet to the cooled chamber may be coupled to the output of an initial condensing unit operative to condense crude oil products from the effluent stream.

A method of extracting products from a gas stream according to the invention comprises the steps of feeding the gas stream to a cooled chamber having disposed therein a plurality of sequential conduit loops and a critical orifice following each loop, and condensing a product in each loop based upon the physical characteristics of the loop, the sizing of the critical orifice following the loop, and the temperature within the chamber. The products condensed in the loops may be stored in gas or liquid form.

In terms of oil and gas production, the method may further comprise the steps of:

forming a hole in a body of nonrubilized oil shale or sand;
positioning a gas inlet conduit into the hole;
heating and pressurizing a processing gas;
introducing the processing gas into the hole through the gas inlet conduit, thereby creating a nonburning thermal energy font sufficient to convert kerogen in oil shale or bitumen in oil sand to hydrocarbonaceous products;
withdrawing the processing gas and hydrocarbonaceous products as effluent gas through the hole;
performing one or more primary condensation steps to recover crude oil products from the effluent gas; and
performing a secondary condensation step on the effluent gas by feeding the effluent gas to the cooled chamber as the gas stream.

DETAILED DESCRIPTION OF THE INVENTION

In common with the teachings of U.S. Pat. No. 7,048,051 ("the '051 patent"), this invention is directed to the extraction of hydrocarbonaceous products from nonrubilized oil shale. The system and method are also applicable to recovery from oil sands and tar sands with appropriate engineering modification described in further detail herein.

Figure 1:
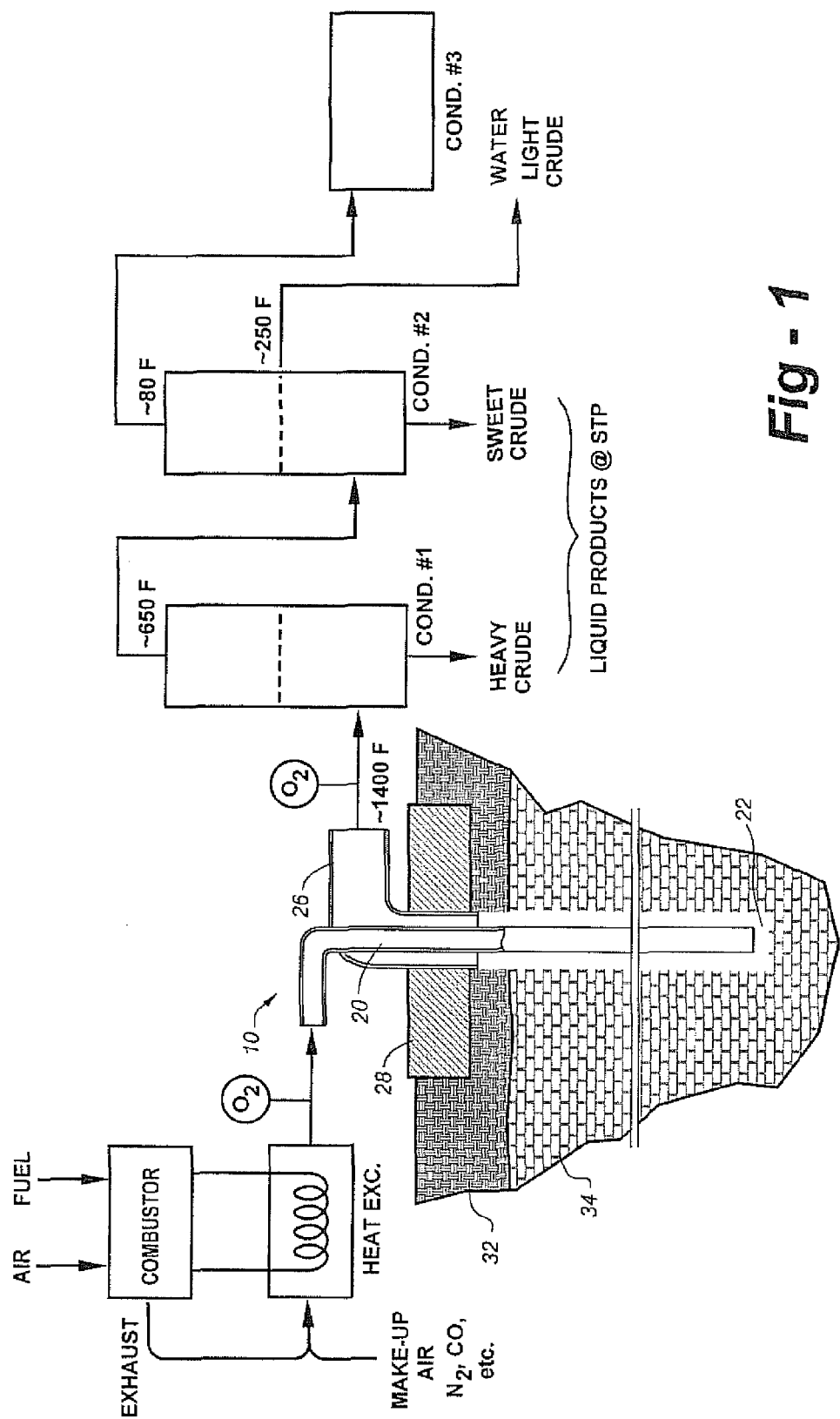
FIG. 1 is a schematic drawing showing improvements to both the injection and collection sides of a well.

Referring now to FIG. 1, a hole 22 is drilled through an overburden 32 and into an oil shale body or formation 34 to be treated. A processing gas inlet conduit 20 is disposed within hole 22. Preferably, the conduit 20 is constructed of a heat conductive and refractory material (for example, stainless steel) which is capable of withstanding temperatures of up to 2000° F. or greater. The processing gas inlet conduit 20 is preferably positioned within hole 22 by a distance of at least about twice the diameter of the conduit 20. An effluent gas conduit 26 is positioned around the opening of the hole 22 for receiving an effluent gas which includes the processing gas and hydrocarbonaceous products formed from the pyrolysis of the kerogen in the case of oil shale.

In the case of the '051 patent, the pressurized processing gas is air, which is heated by burning a combustible material introduced into combustor 16 through a supply conduit. The air is drawn from the ambient environment, compressed and delivered to the combustor by way of a gas conduit. While a recycling conduit may be provided between the gas conduit and the combustor 16 to facilitate the optional recycling of a portion of the gaseous fraction of hydrocarbonaceous products to the combustor 16. Although a mechanism can be provided for recycling a portion of the waste inorganic gas (which contains carbon dioxide) to the compressor 12 so as to augment the concentration of carbon dioxide in the processing gas, no details are provided with regard to carrying this out.

Processing Gas Considerations

The instant invention improves upon previous configurations by relying largely on gases other than air as the processing gas. Continuing the reference to FIG. 1, air and fuel enter the combustor where the fuel is burned, generating heat in a heat exchanger. Although the burner and heat exchanger are drawn as two separate boxes, they may be integrated as disclosed in the '051 patent. The primary gas flow entering the heat exchanger is the exhaust from the combustor itself. The circulation of the exhaust gas through the heat exchanger results in a closed-loop process that not only increases efficiency, it also provides an oxygen-deprived reduction environment in the extraction well.

In the preferred embodiment, the fuel used for the combustor is at least partially derived from the effluent gas stream through processes described elsewhere herein. As such applicable fuels may include straight or mixtures of methane, ethane, propane, butane, and or hydrogen and so forth. Air is used only as a "make-up" gas into the heat exchanger, and the level of make-up air may be adjusted so that gas used for extraction has an oxygen of 1 percent or less. The lower oxygen content in the processing gas is advantageous for several reasons. For one, higher levels of oxygen can auto-ignite down at the bottom of the well. In particular, oxygen content may be adjusted by changing the fuel mixture of the combustor to achieve a very rich fuel mixture, thereby diminishing the level of oxygen. Oxygen sensors in communication with conduits 20 and 26 are preferably provided to monitor $O_2$ content into and out of the well to maintain desired operating conditions.

Like all burners, the combustor may only be 60 to 80 percent efficient. However, a boiler may be used to create steam, with the waste heat being used to run a turbine to create electricity as needed for different on-site operations.

Multi-Stage Condensation

An effluent gas conduit 26 is positioned around the opening of the hole 22 for receiving an effluent gas which includes the processing gas and hydrocarbonaceous products formed from the pyrolysis of kerogen. The effluent gas conduit 26 further serves to transfer the effluent gas to above-ground condenser units. The '051 patent discloses a single condenser that collected products emerging from the well as a vapor at standard temperature and pressure (STP). The liquid fractions of the hydrocarbonaceous products were removed from the bottom of the condenser; however, those portions that were or could not be condensed into a liquid at STP were vented to the atmosphere.

This invention improves upon the collection side of the system as well through multiple stages of condensation, with the goal being to recover all liquid and gaseous products.

The preferred embodiment incorporates three stages of condensation. The first stage collects only the heavy crude. The second stage collects the light and medium crudes and water; the last stage collects gaseous products, including methane, ethane, propane, butane, carbon dioxide, nitrogen and hydrogen. As with the reduced-oxygen processing gas improvements described earlier, the use of multiple condensation stages is considered patentably distinct. That is, while the combination of the processing gas improvements and multiple condensation stages achieves certain symbiotic benefits in combination, the improvements to the injection side and the collection side of the well may be used independently of one another. This third condenser stage, in particular, is applicable to industries outside of the petroleum industry; for example, the general gas industry, the chemical industry, and others.

Cooling coils are typically used in the first two condenser stages. The invention is not limited in this regard, however, in that other known devices such as coolant-filled 'thumbs' may alternatively be used. All of the products recovered by condensers one and two are liquid products at STP. In the oil industry heavy, medium and light crudes are separated by API numbers, which are indicative of density. Heavy crude is collected from condenser #1, whereas light and medium crudes are collected by condenser #2. The light crude comes out with water, which is delivered to an oil-water separator known in the art. The heavy crude is preferably pumped back into a reflux chamber in the bottom half of condenser #1 to continue to crack the heavy crude and recover a higher percentage of sweet and light crude products. This also creates more gas products in condenser #3.

As flow rate is an important consideration in condensation, a distinction should be made between CFM (cubic feet per minute) and ACFM, or actual CFM, which takes temperature into account. At 1400° F., the temperature of the processing gas entering the well has a flow rate of approximately 840 ACFM. Exiting the well the temperature will be near 1400° F. but the flow rate could reach as high as 2000 ACFM depending on product content. Once the liquid products are removed and the gases get cooled down to 80° for condensation purposes, the flow rate gets reduced to approximately about 200 ACFM. These considerations are particularly important in the last condenser stage, which uses pressure loops and critical orifices to recover the individual gaseous products.

Figure 2:
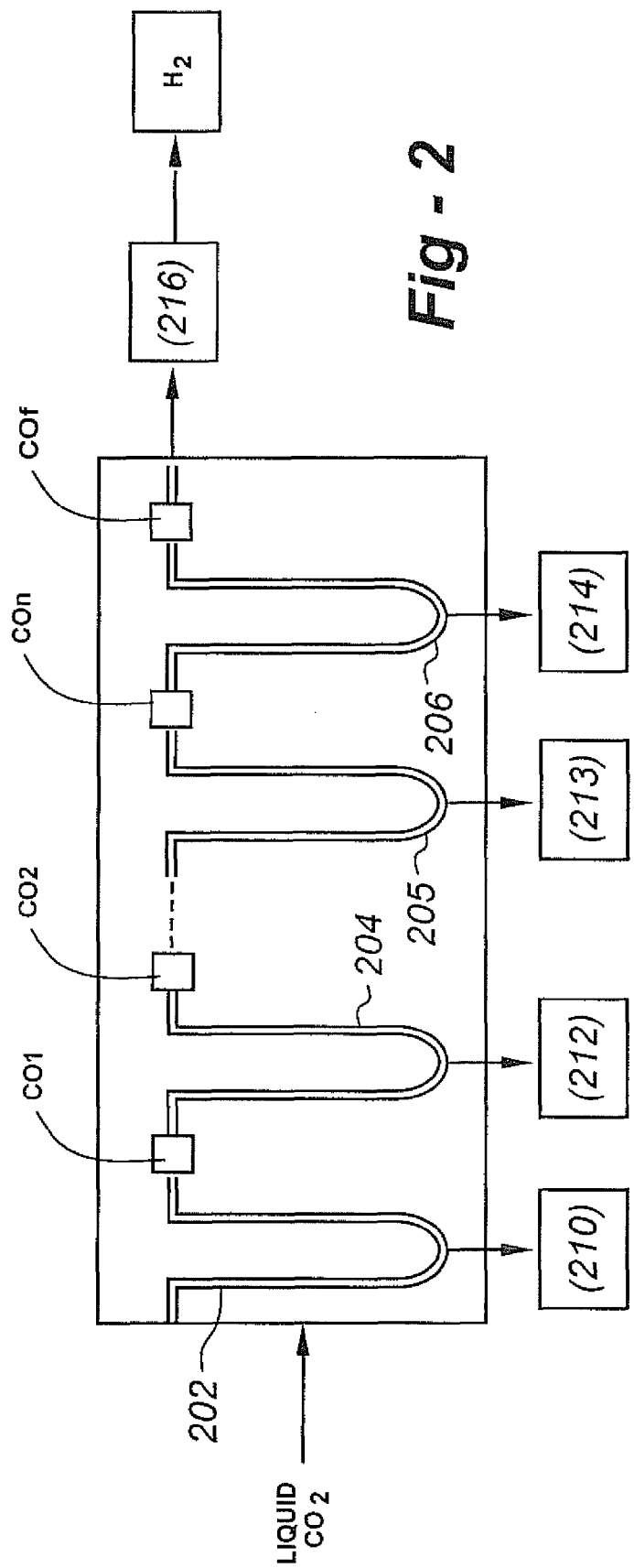
FIG. 2 is a detail drawing of a third condenser unit.

FIG. 2 is a detail drawing that focuses on the final stage of condensation. The condenser unit is actually a set of condensers enabling various components to be divided out in terms of temperature and pressure on an individualized basis. Condenser #3 includes a sealed, insulated housing filled with a coolant, preferably liquefied $CO_2$. Conveniently, the liquid $CO_2$ is recovered by condenser #3 itself, as described in further detail below.

The inside of condenser #3 is maintained at a temperature of about −80 to −100° F. from the liquid carbon dioxide. Immersed in the liquid $CO_2$ are a series of loops, each with a certain length, and each being followed by a critical orifice that establishes a pressure differential from loop to loop. The length of each loop establishes a residency time related to the volume of the individual components within the gas mixture.

Each loop between each set of orifices is physically configured to control the pressure in that loop as a function of the temperature within the condenser, causing particular liquefied gases to become collectable at different stages. In FIG. 2, loop 202 and critical orifice CO1 are configured to recover propane and butane, which is collected at 210. Loop 204 and critical orifice CO2 are configured to recover $CO_2$, which is collected at 212. Loop 205 and critical orifice COn are configured to recover methane, which is collected at 213. Loop 206 and critical orifice COf are configured to recover nitrogen, which is collected at 214. Following the final critical orifice, COf, hydrogen is recovered. A compressor 216 not only compresses the collected hydrogen gas into a tank, in conjunction with product condensation and removal it creates a negative pressure back up the line, between condensers #2 and #3, and all the way down into the well. The significance of this negative pressure will be addressed in subsequent sections.

The purity of the collected gaseous products may vary somewhat. Methane, for example, is quite pure, and the hydrogen is extremely pure. All of the gaseous products are collected in the liquid state, and all are maintained as liquids except hydrogen, which emerges as a gas and it not compressed into a liquid (although it could be). The propane may be mixed with butane, and may be kept as a combined product or separated using known techniques. To assist in the recovery of the gaseous products into a liquefied state, there is an initial storage tanks for these products built into the condenser or at least physically coupled to the condenser to take advantage of the cooled $CO_2$ from where the recovered products are then pumped into external pressurized storage tanks.

The only materials which pass through the critical orifices are in the gaseous state. In terms of dimensions, the input to condenser #3 may have a diameter on the order of several inches. The critical orifices will also vary from 1/8" or less initially down to the micron range toward the output of the unit.

As mentioned, the goal of this aspect of the invention is recover all products on the collection side of the well and, in some cases, use those products where applicable for processing gas formation or product collection. In addition to the collected liquid $CO_2$ being used to cool condenser #3, the combustible gases may be used to run the combustor, particularly if the combustor has a BTU rating which is higher than necessary. For example, if the combustor needs a BTU in the 1000 to 1100 BTU range, combustible gasses like propane and butane collected from compressor #3 may be mixed with recovered combustible gases such as low BTU gas like hydrogen or an inert gas like nitrogen to achieve this rating.

In terms of dimensions, condensers #1 and #2 may be on the order of 4 feet in diameter and 20 feet long, whereas compressor #3 may be 2+ feet by 8 feet, not including the compressors or the tanks. All such sizes, pipe diameters, and so forth, are volume dependent. Whereas, in the preferred embodiment, the injection and collection equipment may be used for multiple wells, such as 16 wells, but they could used for more or fewer with appropriate dimensional scaling.

Physical aspects of condenser #3 will also vary as a function of the installation; in other words, the actual size of the loop within each phase may vary as a function of gas content which might be site-specific. Accordingly, prior to operation if not fabrication, an instrument such as an in-line gas chromatograph may be used to determine the composition of the flow into condenser #3. The analysis may then be used to adjust the physical dimensions of the unit; for example, to construct a condenser which is specific to that site in terms of what products and/or contaminants are being produced.

Use of the Venturi Effect

Referring back to FIG. 1, the temperature differential of approximately 1400° F. to 650° F. across condenser #1. This establishes a negative pressure in view of the fact that liquid products are recovered from the unit. The same is true with condenser #2, which goes from approximately 650° F. to 250° and then another 200°, 180° temperature differential before the output goes to condenser number three.

Oil shale is present in various strata, with significant horizontal permeability and very little vertical permeability. The horizontal permeability of one layer might be quite different from the permeability of other layers. The use of compressor 216 in conjunction with pressure differentials across the condensers, establishes a negative pressure all the way down into the well. As vapor molecules leaving the well are pulled across the face of the rock, a Venturi effect is created that effectively draws the now heated kerogen out of these horizontally permeable strata. This action improves extraction, facilitating an active rather than passive collection of products.

Physical Parameter Adjustment

The combination of various physical parameters associated with the invention allows for a wide rage of adjustments in overall operation. As one example, assume that the system is producing an undesirable high percentage of heavy crude. Several things may be done to rectify such a situation. Excess heavy crude may means that the kerogen is not being cracked as efficiently as it could be. One solution is to slow down the flow rate of the processing gas being pumped down into the well, thereby increasing the residency time of the heated gas. Alternatively, the temperature of the processing gas may be increased to enhance cracking down in the well, thereby reducing the amount of heavy crude. As a further alternative, reflux time in condenser #1 may be increased. Such techniques may be used alone or in combination.

Indeed, according to the invention, various physical parameters may be adjusted to alter the ratio of products and/or the amount of gas collected in the end. These parameters include the following:
   processing gas temperature;
   processing gas pressure;
   flow rate;
   residency time;
   reflux time;
   condenser temperature; and
   the negative pressure throughout the collection side of the system.

These parameters may be 'tuned' to maximize product output. However, such adjustments may have other consequences. For example, a higher processing gas residency time in the well might increase carbon monoxide production, which could lead to secondary effects associated with the liquids extracted, the oil liquid extracted, and/or the liquefied gases taken out of the third condenser.

The adjustment of physical parameters may also have an effect upon contaminant generation. Oil shale is a compressed organic material which contains elements such as sulfur from pyrite or other contaminants or minerals. One advantage of the instant invention is that the well is operated at a very reducing environment, preferably less than 1 percent oxygen, such that reactions with materials such as sulfur are minimized. Nevertheless, the physical parameters discussed above may be adjusted to reduce the level of contaminants such as sulfur.

Opportunities for Carbon Sequestration

Another advantage made possible by the invention is the opportunity for large-scale carbon sequestration. Certain existing carbon sequestration processes simply fill abandoned mines with carbon dioxide which, being heavier than air, ideally remains in place. However, cracks and fissures may exist or develop, allowing the gas to leak out. In addition, the large surface area of the mine is not used directly, thereby reducing the potential efficiency of the sequestration process.

According to this invention, when kerogen is cracked and removed from the wells recovery cylinder, the remaining product at high temperature exhibits a vast system of micropores that are coated with char. The resulting in an enormous surface area which allows for the direct adsorption of carbon dioxide. Accordingly, following a mining operation, carbon dioxide may be pumped down into the well to be adsorped by these porous materials.

Figure 3:
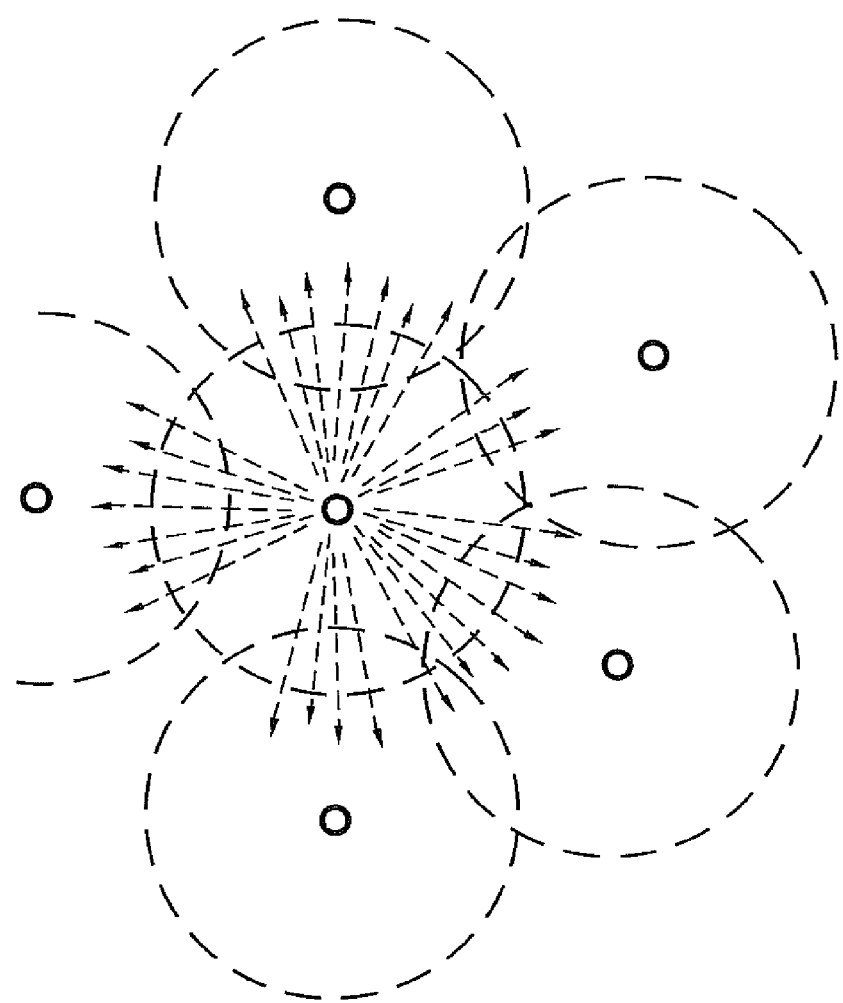
FIG. 3 shows how depleted wells may be used for carbon sequestration.

FIG. 3 is a top-down view of a multi-well operation. The small circles depict the well holes, while the dashed lines indicated depleted kerogen. As the drawing shows, these depleted regions may overlap in places. According to the invention, a central well is selected for $CO_2$ injection. The injected gas migrates toward the other wells which are not being injected. If there were only one well, or if the depleted regions of multiple wells did not overlap, the injected $CO_2$ may ultimately find its way to the other wells through natural diffusion. However, this is an exceedingly slow mass transport process due to the fact that diffusion depends upon a concentration gradient. However, with overlapping regions of depleted kerogen a high degree of permeability exists from one well to another and a much more active mass transport process based upon dispersion or advection may occur, which is orders of magnitude faster than diffusion.

During this process, the uncapped wells around the injection well will be monitored, and when a sufficient level of $CO_2$ is detected, a desired level of saturation can be determined. Again, the $CO_2$ used for injection may be derived from the system itself, through the output of condenser #3, described above. As such, the $CO_2$ may be injected in liquid form. Overall, it may be possible to achieve a 70 to 80 percent replacement of volume for the kerogen removed with the injected $CO_2$.

Modifications for Oil and Tar Sands

The systems just described may be useful not only in oil shale, but also in oil/tar sands with appropriate engineering modification. In oil shale, kerogen is cracked, which has a molecular weight on the order of 1000 Daltons or greater. With oil and tar sands bitumen is being cracked, which has a molecular weight of about half that of kerogen. In fact, when cracking kerogen, a transition occurs from kerogen to bitumen to oil products. As such, with oil and tar sand an initial high-temperature cracking and gasification step is not necessary. Temperatures on the order of 600° F. to 800° F. are useful as opposed to the 1200° F. to 1600° F. used for kerogen cracking and gasification. The first condenser described above may therefore be unnecessary.

In contrast to oil shale, oil/tar sands are generally not stratified but instead exhibit omnidirectional permeability. As such the use of the Venturi effect discussed above is not available. Additionally, since sands 'flow,' provisions need to be made for the well casing to ensure against fill-in.

Figure 4:
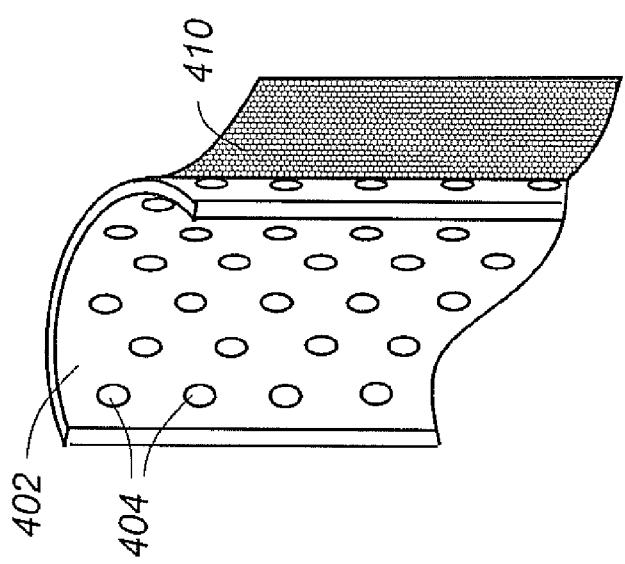
FIG. 4 is a simplified drawing of a casing applicable to oil and tar sand extraction operations.

Referring to FIG. 4, for oil/tar sand applications, a central, in-well pipe 402 with apertures 404 would be placed during the drilling operation. The apertures 404 may include small holes, diagonal cuts, mesh features, and so forth, depending upon material composition and potential flow rate. For example, perforations on the order of an inch or thereabouts would be provided throughout the length of the pipe and, behind that (against the sands) a screen 410 with much smaller opening would be used. The holes may be cut into the pipe at a vertical angle to restrict sands from falling back into the well hole. Materials similar to window screen could be used, though high-integrity (i.e., "304") stainless steel would preferably be used for construction.

To sink the well, a flat coring bit would be used, with the casing just described following directly behind that. The casing would be installed during the drilling process. The material removed during the drilling process would be pumped up through the casing. When the coring bit reaches its destination, it remains in position with casing situated above it.

We claim:

1. A system for recovering products from a gas stream, comprising:
   a cooled chamber having an inlet for receiving the gas stream;
   the inlet feeding a plurality of sequential conduit loops within the chamber;
   a critical orifice following each loop; and
   an output port in communication with each loop to output a product condensed from the gas stream based upon the physical characteristics of the loop, the sizing of the critical orifice following the loop, and the temperature within the chamber.

2. The system of claim 1, wherein the physical characteristics of the loops, the sizing of the critical orifices following the loops, and the temperature within the chamber enable one or more of the following products to be condensed from the gas stream:
   ethane,
   propane,
   butane,
   carbon dioxide,
   methane,
   nitrogen, and
   hydrogen.

3. The system of claim 1, wherein liquid carbon dioxide is used to cool the chamber.

4. The system of claim 1, wherein:
   the physical characteristics of the loops, the sizing of the critical orifices following the loops, and the temperature within the chamber enable liquefied carbon dioxide to be condensed from the gas stream; and
   the liquefied carbon dioxide is used to cool the chamber.

5. The system of claim 1, wherein the gas stream is an effluent gas stream containing hydrocarbonaceous and additional products from a hole drilled in nonrubilized oil shale and oil/tar sands heated with a pressurized processing gas introduced into the hole.

6. The system of claim 1, wherein the inlet to the cooled chamber is coupled to the output of an initial condensing unit operative to condense crude oil products from the gas stream.

7. The system of claim 1, wherein the inlet to the cooled chamber is coupled to the output of an initial condensing unit operative to condense crude oil products from a gas stream obtained from one or more shale or sand oil-extraction wells.

* * * * *